United States Patent [19]

Montferme

[11] 4,287,980
[45] Sep. 8, 1981

[54] DEVICE FOR DISTRIBUTING CONTAINERS INTO SEVERAL ROWS AND MACHINE USING SUCH A DEVICE

[75] Inventor: Daniel Montferme, Vernouillet, France

[73] Assignee: E. P. Remy et Cie., Dreux, France

[21] Appl. No.: 100,188

[22] Filed: Dec. 4, 1979

[30] Foreign Application Priority Data

Sep. 21, 1979 [FR] France ............................... 79 23565

[51] Int. Cl.³ .......................................... B65G 47/30
[52] U.S. Cl. .................................. 198/425; 198/440; 198/479
[58] Field of Search ............... 198/440, 449, 442, 436, 198/425, 456, 461, 479, 653, 695–696, 431, 458; 53/543

[56] References Cited

U.S. PATENT DOCUMENTS 3,322,596 5/1967 Vergobbi et al. ............... 198/461 X
4,170,288 10/1979 Mebus ................................ 198/440

FOREIGN PATENT DOCUMENTS 2379439 10/1978 France ............................... 198/425

Primary Examiner—Robert B. Reeves
Assistant Examiner—Douglas D. Watts
Attorney, Agent, or Firm—Kenyon & Kenyon

[57] ABSTRACT

A device for distributing containers into several rows includes a conveyor arranged above a single row of containers and carrying gripper heads adapted to positively and temporarily grip the containers, the gripper heads being individually movably mounted on respective transverse bars spaced along the length of the conveyor. The device further includes actuating cams for opening and closing the gripper heads driven by the conveyor and actuating means for transversely displacing the gripper heads into a plurality of parallel paths while they are driven by the conveyor.

12 Claims, 7 Drawing Figures

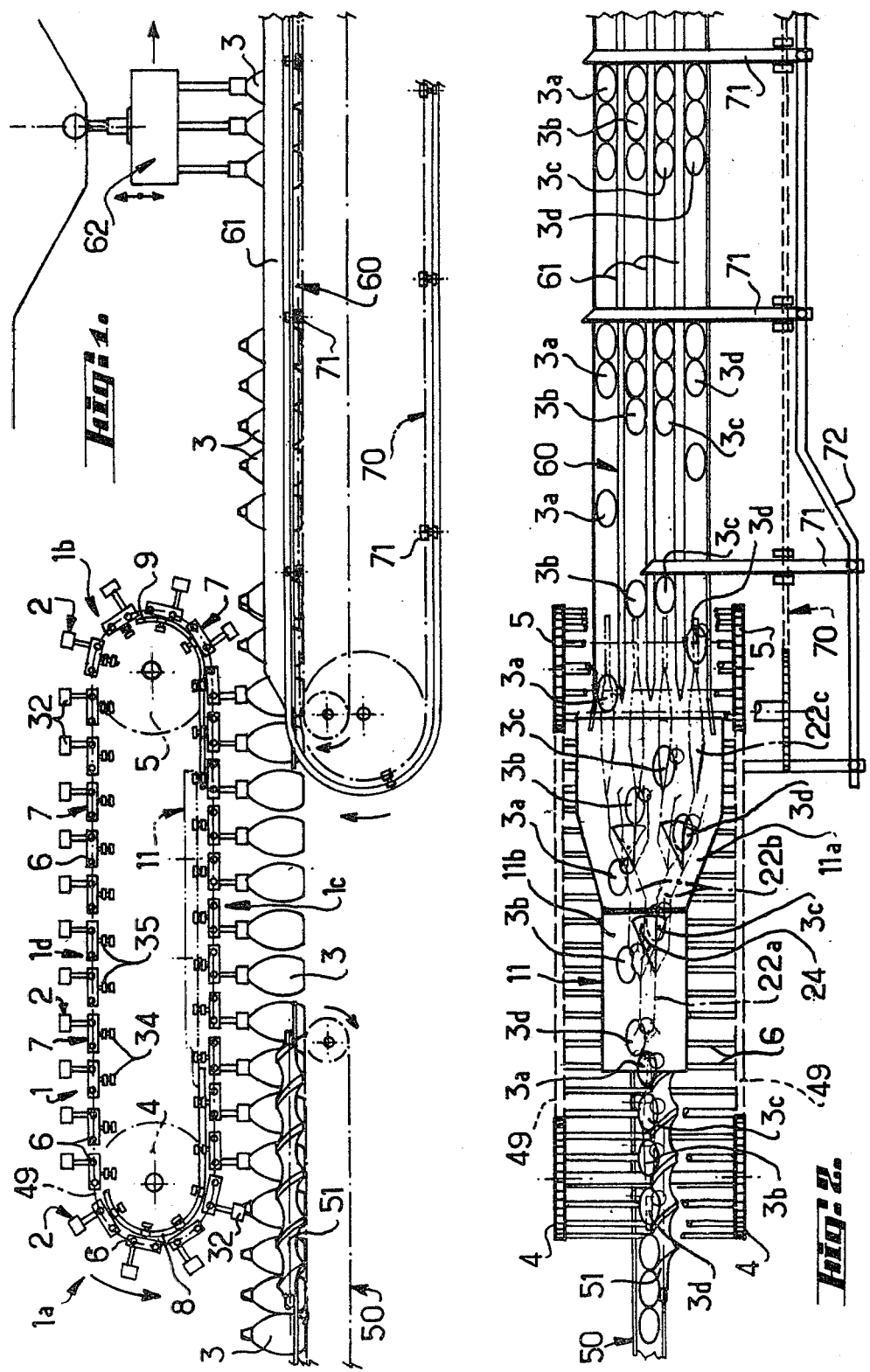

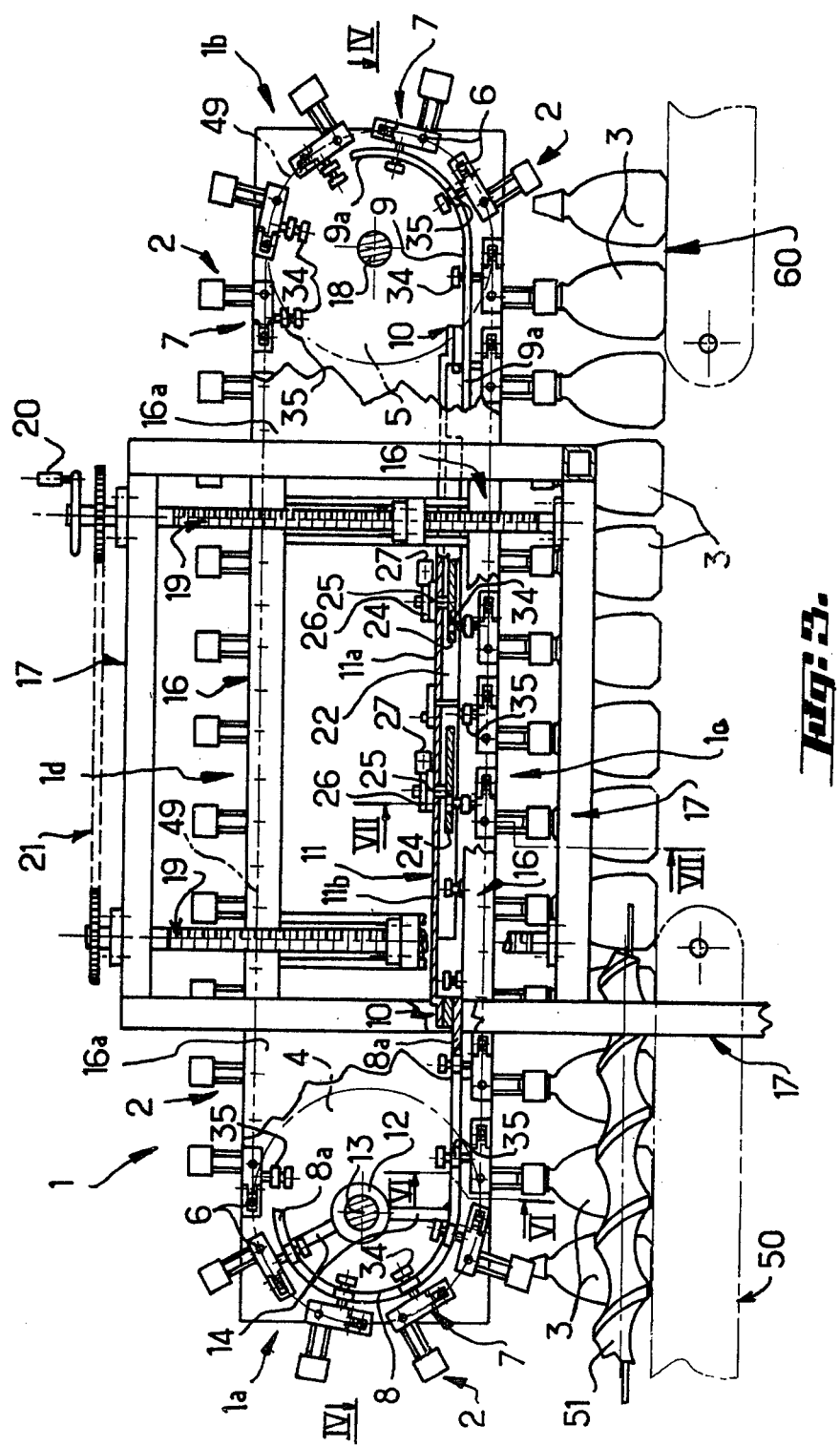

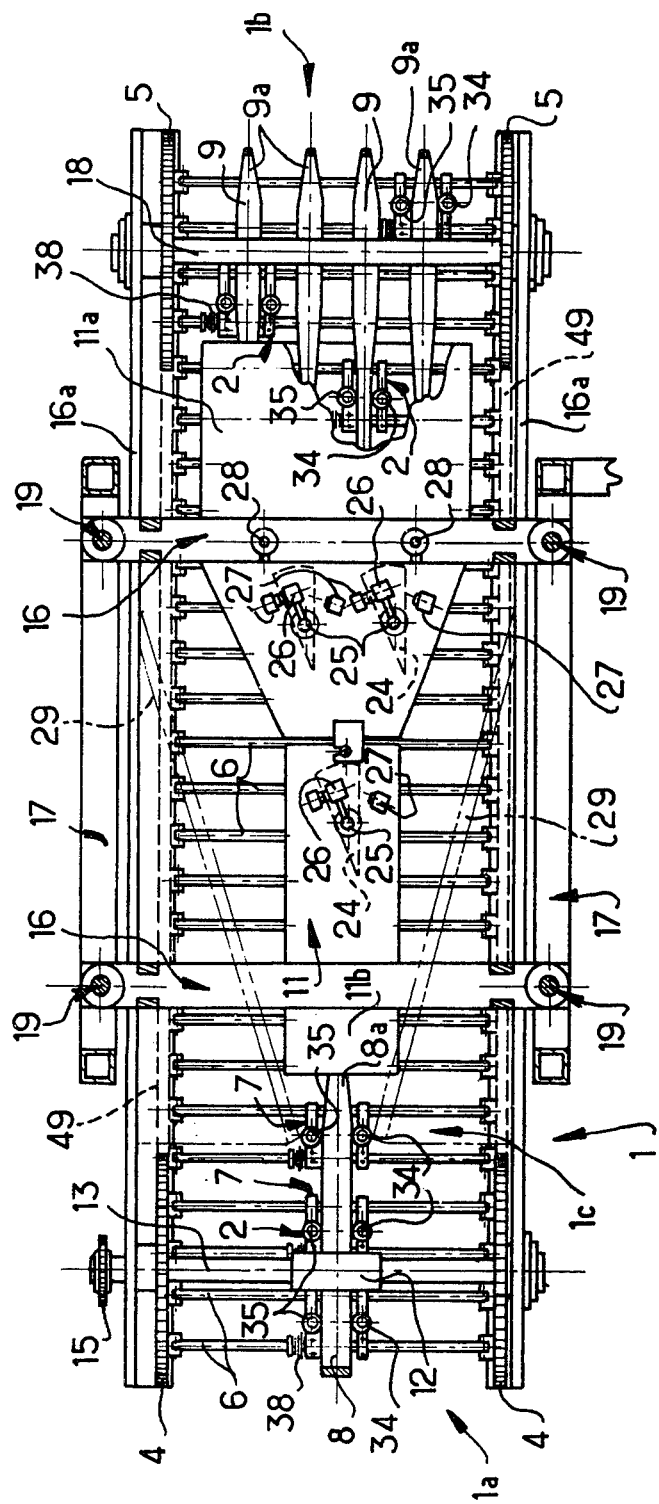

DEVICE FOR DISTRIBUTING CONTAINERS INTO SEVERAL ROWS AND MACHINE USING SUCH A DEVICE

The present invention relates essentially to a device for distributing containers into several rows with a view to forming groups of containers which are thereafter placed into cases.

There are already known various devices allowing the distribution of a single row of bottles into several rows so as to obtain groups of bottles which are thereafter processed.

As a rule, such devices comprised guides arranged above a container feeding belt, which guides were subjected to either transverse or longitudinal oscillations, or to vibrations, so as to distribute a single row of containers or of bottles into two or several rows. This purpose could be achieved by using a distributing conveyor arranged above the bottles.

All the systems used hitherto were satisfactory when the containers or bottles concerned were rigid and of a given shape, but when the containers were brittle or readily damageable and of complicated shape, it was found that the distribution into several rows of containers by means of the prior systems could not take place correctly. No distributing device for such containers has hitherto been provided to ensure a positive gripping of the containers allowing the same to be distributed into several rows reliably and without any trouble occurring during the distributing operation.

The present invention has for its purpose to remedy this situation by providing a device for distributing containers such as for example bottles, flasks or the like, which, whatever the brittleness or breakability and shape of the containers, offers excellent reliability in operation owing essentially to its positive container-gripping capacity.

To this end, the invention is directed to a device for distributing articles, such as containers, into several rows, e.g. for the purpose of forming groups of containers which are thereafter processed, e.g. encased, the said device comprising a conveyor arranged above a row of containers and with which are associated means for distributing the said row into at least two rows of containers, characterized in that the said means are constituted by gripper heads ensuring a positive and temporary gripping of the containers and movably mounted on the said conveyor transversely to the longitudinal direction thereof, actuating means for opening and closing the gripper heads driven by the conveyor, and actuating means for displacing the gripper heads transversely while they are driven by the conveyor in the longitudinal direction.

According to another characterizing feature of the invention, the actuating means for opening and closing the gripper heads are arranged at both ends of the said conveyor, whereas the actuating means for transversely displacing the said gripper heads are arranged in substantially parallel relationship to the upper and lower sides of the conveyor.

Advantageously, the actuating means for the opening, closing and transverse displacement of the gripper heads are secured to a frame supporting the conveyor and mounted vertically movable on a stationary frame.

The conveyor carrying the gripper heads can be easily adapted to any height of the containers to be distributed.

According to still another characterizing feature of the invention, the actuating means for opening and closing the gripper heads are constituted by crescent-shaped cams with tapering ends, the said cams being arranged interiorly of the two conveyor sides and their radius of curvature corresponding substantially to that of the conveyor ends.

According to a preferred form of embodiment, the said cams are secured at one of their ends to the actuating means for transverse displacement of the gripper heads, one of the cams being also supported by a portion forming a hub for the conveyor drive shaft.

According to still another characterizing feature, the actuating means for transverse displacement of the gripper heads are constituted notably by a plate secured to the said movable frame and arranged directly above the lower side of the conveyor, the underside of the said plate being provided with channels and pivoting abutments forming gripper-head shunting means.

Also to be noted is the fact that the abutment pivot pin, when the abutment is in its endmost pivoting position, is retained by permanent magnets mounted on the upside of the said plate.

Furthermore, at least a portion of the said plate is removably mounted on the movable frame.

Thus, the plate may be replaced at least partially by another plate according to the number of container rows which it is desired to obtain.

According to another characterizing feature, the actuating means for transverse displacement of the gripper heads also comprise a cam arranged in proximity to and directly below the upper side of the conveyor and having a generally V-shape.

This cam allows the realining of the gripper heads on the upper side of the conveyor after they have fulfilled their conveyor distributing function.

According to another characterizing feature of the invention, the said gripper heads, mounted so as to slide freely on transverse bars between two chains constituting the said conveyor, each include two grips, one of the grips being provided with a guiding means such as a roller or the like cooperating with the channels and the pivoting abutments of the said plate, and each of the two grips of each gripper head being provided with another guiding means, such as a roller or the like, cooperating with the said cams.

Also, the grip of each gripper head cooperating with the channels and the pivoting abutments is jointly movable with a sleeve sliding on the conveyor bars, whereas the other grip of each gripper head is slidingly mounted on the said sleeve.

According to another characterizing feature of the invention, a return means, such as a spring, is mounted between the sleeve and the said other grip so as to constantly urge the two grips towards one another into the closed position.

The invention is also directed to a machine using a device according to the aforementioned characterizing features and characterized in that under one of the ends of the said conveyor is arranged an endless screw advancing the containers in a single row and with a given pitch, whereas under the other end of the conveyor is provided a belt or the like for conveying the containers in several rows and with which is associated a conveyor driving bars capable of automatically advancing above the surface of the said belt.

Furthermore, with the said bar-driving conveyor is associated a cam path receiving the ends of the bars.

Other characterizing features and advantages of the invention will appear more clearly from the following detailed description made with reference to the appended drawings given solely by way of example and wherein:

FIG. 1 is a diagrammatic elevational view of a distributing device according to the invention, with which various elements are associated to allow the advancement of a row of containers, the discharge of the containers in several rows and their grouping, as well as the gripping of the grouped containers;

FIG. 2 is a diagrammatic top view of the assembly shown in FIG. 1;

FIG. 3 is an elevational view, with parts broken away and to a larger scale, of the distributing device according to the invention;

FIG. 4 is a sectional view substantially upon the line IV—IV of FIG. 3;

FIG. 5 is a view from below of the plate for distributing the containers into several rows;

Figure 6:
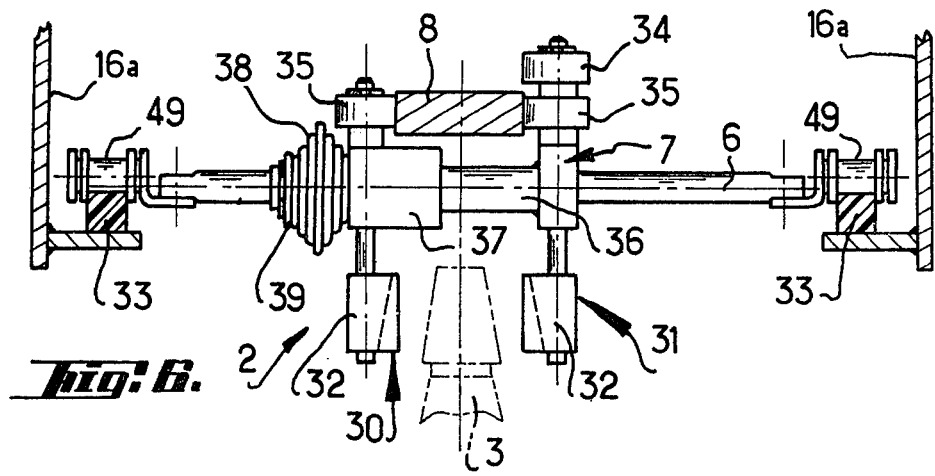
FIG. 6 is a view showing the gripper heads in the open position and according to the sectional line VI—VI of FIG. 3.

According to the embodiment illustrated, a distributing device according to the invention comprises essentially a distributing conveyor 1 carrying a plurality of gripper heads 2 capable of ensuring a positive and temporary gripping of the containers, receptacles or the like 3, which, for example, may be bottles or flasks of a special shape, with a view to distributing them into several rows.

More specifically, the conveyor 1 comprises a pair of chains 49 passing round two pairs of toothed wheels 4 and 5, and interconnected by transverse bars 6 on which the gripper heads 2 can slide freely. As seen in FIGS. 1 to 4, the gripper heads 2 are each carried by a support 7, each support 7 being slidingly movable upon two adjacent bars 6.

The opening and closing of the gripper heads 2 are ensured by cams 8 and 9 which, as seen in FIGS. 1, 3 and 4, are crescent-shaped with tapering ends 8a and 9a and the radius of curvature of which corresponds substantially to that of the ends 1a and 1b of conveyor 1. According to the embodiment illustrated, the cam 8 provided at the end 1a of the conveyor 1 is single, whereas at the other end 1b of conveyor 1 are provided four crescent-shaped cams such as 9. The cams 8 and 9 are arranged within the conveyor 1, as seen clearly in the drawings.

One of the ends 8a, 9a of the cams 8 and 9, respectively, is attached at 10 to a plate 11 ensuring the transverse displacement of the gripper heads 2 along the bars 6, as will be described later.

The cam 8, as clearly seen in FIG. 3, is also supported by arms 14 radially connected with a portion forming a hub 12 for the driving shaft 13 of the conveyor 1. At 15 in FIG. 4 is shown a sprocket wheel which is keyed to the shaft 13 for driving the conveyor 1.

The conveyor 1 together with its associated members comprising essentially the gripper heads 2, the plate 11 and the cams 8 and 9 are jointly movable with a first frame 16 which is vertically movable on a stationary frame 17 (FIGS. 3 and 4). At 16a are shown plates provided on each side of the conveyor proper, forming part of the movable frame 16 and in which the shafts 13 and 18 of the conveyor rotate. Mechanical jack means 19 actuated for example by means of a handwheel 20 and a chain drive 21 provide for vertical displacement of the movable frame 16 in the stationary frame 17. This displacement allows the conveyor 1 and its associated means to be positioned at the desired height depending on the vertical dimension of the bottles 3.

The plate or platform 11 is arranged directly above the lower advancing portion 1c of conveyor 1 and in parallel relationship thereto. As seen more clearly in FIG. 5, the underside of plate 11 is provided with a plurality of channels or grooves 22 obtained for example by means of ribs or the like 23 projecting from the plate 11. At the point where the channels 22 divide into two channels are provided abutments or the like 24 pivotally mounted at 25 under the plate 11. Each pivoting abutment 24 is in the shape of a triangle, one tip of which is directed towards the cam 8. The abutments therefore form means for shifting the gripper heads 2 as will be described later.

The pivoting of the abutments 24 in one direction and the other is performed by the bottles 3, or more exactly, the gripper heads 2 holding the bottles during their advancement in the channels 22, the pivot pin 25 of each abutment passing through the plate 11 and being provided, as seen in FIG. 4, with an arm having a head 26 which is adapted to stick to one or the other of a spaced apart pair of permanent magnets 27 secured to the top of plate 11 in association with each abutment for holding each abutment at either end, respectively, of a predetermined pivoting arc.

According to the embodiment illustrated, the plate 11 is provided with an inlet channel 22 which divides into two channels 22b which themselves divide into two more channels to form four channels 22c. However, a number of channels smaller or greater than four can be provided without departing from the scope of the invention. To this end, the plate 11 can be interchangeable and, according to the embodiment illustrated, may comprise a fixed portion 11b secured to the movable frame 16 and a portion 11a removably mounted on the said movable frame. At 28 in FIG. 4, the portion 11a of the plate 11 is shown removably fastened to a cross-member of the movable frame 16.

Also shown diagrammatically in FIG. 4 is a cam 29 associated with the movable frame 16, arranged in proximity to and directly below the upper returning portion 1d of the conveyor 1 and having a general V-shape, the tip of which is directed towards the tapering end 8a of the cam 8. The cam 29, as will also be seen later, serves to direct the gripper heads 2 on the upper returning portion 1d of the conveyor 1 towards the cam 8 where they are actuated.

The gripper heads 2 will now be described in detail with particular reference to FIGS. 6 and 7.

The gripper heads 2 each comprise two grips 30 and 31 including a portion 32, e.g. of plastics material or rubber, capable of seizing the head of the containers 3, both grips being adapted, as mentioned previously, to slide freely on two adjacent transverse bars 6 whose ends are attached to a corresponding link of each chain 49, which chain slidingly bears upon a longitudinal guide 33 supported by a respective one of the lateral plates 16a of the movable frame 16.

One of the grips, grip 31, of each gripper head 2 comprises a sliding or rolling means such as for example a roller 34 adapted to cooperate with the channels 22 and the pivoting abutments 24 of the plate 11. Each of the one grip 31 and the other grip 30 is provided with a roller 35 adapted to cooperate with the cams 8 and 9. As seen clearly in FIGS. 6 and 7, the rollers 35 associated with the grips 30 and 31, respectively, are arranged in a horizontal plane which is located below the roller 34 of the grip 31.

The one grip 31 is secured, e.g. welded, on a sleeve 36 which is slidable on one of the bars 6, whereas the other grip 30 is slidingly mounted by its portion 37 on the said sleeve 36. The reference numeral 38 designates a return spring attached at 39 to the sleeve 36 and at 40 to the portion 37 carrying the grip 30 and containing for example a bearing 41 as seen clearly in FIG. 7. The spring 38 constantly urges both grips 30 and 31 towards one another, i.e. to the closed position against the head of the bottle or flask 3.

There will now be described the operation of the distributing conveyor 1 according to the invention, which in the example illustrated, is combined with a certain number of associated means allowing the advancement of the containers in a row, their discharge in several rows, their grouping, as well as the gripping of the grouped containers for their encasement.

The operation of the conveyor 1 will therefore be described together with the operation of the said associated means.

The containers 3 are advanced in a row on an intake conveyor 50 which is followed by or associated with a screw conveyor 51 arranged under the end 1a of the distributing conveyor 1 and causing the containers to be spaced a distance corresponding to the distance between the gripper heads 2. As seen in FIGS. 1, 4 and 6, the gripper heads 2, before reaching a point straight above the heads of the containers 3, have been opened under the action of the cam 8 which has moved the rollers 35 and therefore the grips 30 and 31 of the gripper heads apart from one another. When located straight above the containers 3, the grips of the gripper heads close onto the head of the containers 3, since this is the region where the tapered end 8a of the cam 8 is located, so that the spring 38 urges the grips of the gripper heads towards one another. Thus the containers 3 are positively seized by the gripper heads.

Figure 7:
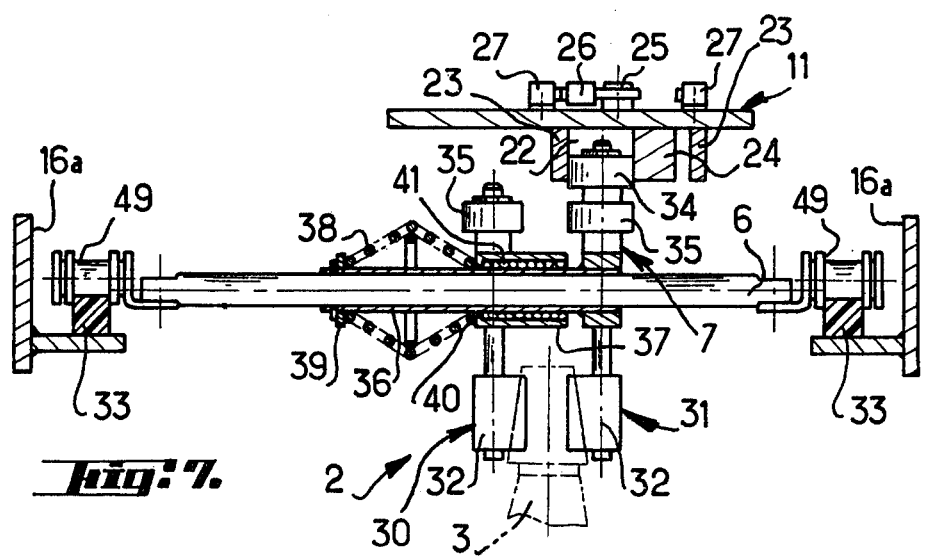
FIG. 7 is a view showing the gripper heads in the closed position and in section upon the lines VII—VII of FIG. 3.
Figure 8:
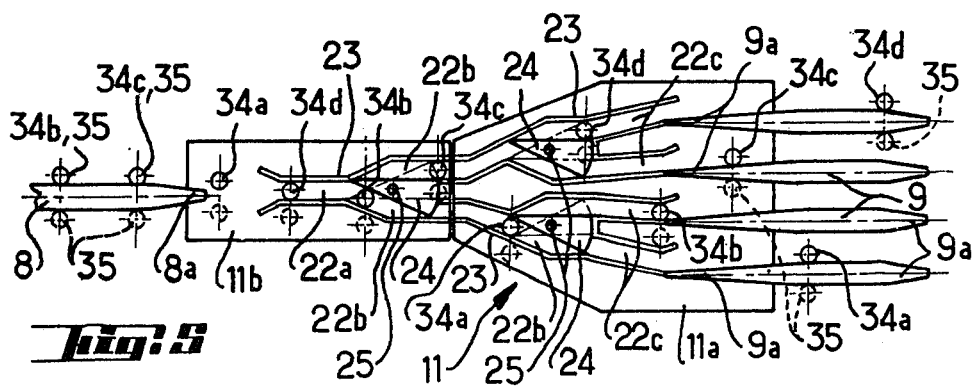

The gripper heads, more precisely the rollers 34, thereafter pass into the channels 22a, 22b and 22c to thus distribute the single row of containers 3 into several rows, i.e. four rows in the example illustrated (see FIGS. 5 and 7).

At this stage the respective rollers 35 of the gripper heads 2 pass on either side of the cams 9, so that the grips 30 and 31 are again moved apart from one another as seen in FIG. 6. Thus the grips release the containers set down in four rows on a conveyor belt 60 provided with guides 61 and above which is arranged a turret with seizing heads such as 62 (FIG. 1), which are adapted to seize and subsequently encase a group of containers. With the conveying belt 60 is laterally associated another conveyor 70 driving bars 71 and which, under the action of a cam path 72 in which is engaged an end of each bar 71, allows the said bars to be advanced above the belt 60 as seen in FIG. 2.

It will be noted at this point that the gripper heads 2, after releasing the bottles 3 on the belt 60, leave the cams 9, close up and are regrouped substantially into a single line owing to the V-shaped cam 29 leading to the cam 8, so that the grips of the gripper heads are again opened by this cam (FIG. 6) and then again closed, as mentioned above, to seize the bottle engaged by the screw 51. Thus the gripper heads as well as the grips of each gripper head, while being driven by the conveyor 1, are subjected to various transverse movements with respect to the longitudinal direction of the conveyor 1 under the action of the cams 8, 9, 29 and the channels 22 under the plate 11.

The path followed by the containers 3 in the various channels 22 are better seen in FIG. 2, where the reference numerals 3a, 3b, 3c and 3d denote the containers pertaining respectively to the four rows placed on the conveying belt 60. In FIG. 5, reference numerals 34a, 34b, 34c and 34d correspondingly denote the position of the roller 34 which corresponds to the position of the containers 3a, 3b, 3c and 3d under the plate 11. It will be noted that the pivoting of the abutments 24 is performed by the rollers 34. More precisely, it is apparent that the rollers 34 passing successively in the channels 22 cause the pivoting of the said abutments in one and then the other direction so as to shift the containers toward one row and then the other.

Lastly, it will be noted that the conveyor 1 and therefore the gripper heads 2 rotate at the same speed as the intake conveyor 50 and the conveying belt 60. This speed, according to a preferred example of embodiment, is equal to about 1.5 times the speed of the conveyor 70, i.e. the translation speed of the bars 71 above the belt 60. In other words, the bars 71 exert a braking action upon the four rows of containers 3 distributed on the conveying belt 60 so as to form a group of containers which can be seized by the seizing head 62, the translation speed of which is of course equal to that of conveyor 70. Thus, owing to the bars 71, which as seen in FIG. 2 are advanced successively above the upper surface of the belt 60, predetermined groups of bottles are obtained.

The invention therefore provides a distributing device or conveyor of particularly simple and reliable design allowing a positive gripping of containers which are brittle or readily breakable or damageable and even of complicated shape to distribute the same into two, three, four or a greater number of rows or lines, in order, for example, to group, seize and place them in cases or the like.

Of course, the invention is by no means limited to the form of embodiment described and illustrated which has been given by way of example only. Thus, the shape and material of the grips in the gripper heads, the method of providing the channels under the distributing plate, as well as the geometry and number of the channels themselves may be selected to meet any requirements without departing from the scope of the invention.

The invention therefore comprises all technical equivalents to the means described as well as their combinations, should the latter be carried out according to its gist and used within the scope of the following claims.

What is claimed is:

1. Apparatus for distributing articles from a single line moving along a predetermined path into a plurality of adjacent lines, the apparatus comprising:
   an endless conveyor extending above the predetermined path through a distributing region;
   a plurality of gripper heads, each gripper head being actuable between an article engaging position and an article releasing position;
   a plurality of means for mounting respective ones of said gripper heads on said conveyor for movement in longitudinally spaced relation through said distributing region, each of said mounting means providing for transverse movement of the respective gripper head relative to said path;

means for aligning each gripper head on its respective mounting means with said single line of articles prior to its entry into the distributing region;

means for actuating each gripper head to the article engaging position upon entry of said gripper head into the distributing region;

at least one branched track means arranged in the distributing region, said branched track means having a single entry and at least two transversely spaced exits, each of said gripper heads having a guiding means engageable with said branched track means;

a deflection member pivotally mounted on said track means for diverting gripper heads from said single entry alternately to said at least two exits; and means for actuating each gripper head to the article releasing position prior to exit of said device from the distributing region.

2. Apparatus for distributing articles according to claim 1 wherein each gripper head comprises at least two gripping members movable toward each other to said article engaging position and away from each other to said article releasing position, a resilient biasing means operatively arranged between said gripping members for continuously urging said gripping members toward the article engaging position, a first cam follower connected to one of said gripping members, and a second cam follower connected to the other of said gripping members; and said means for actuating each gripper head upon the entry of said gripper head into and prior to the exit of said gripper head from the distributing region comprise respectively a first cam member positioned adjacent to the entrance of the distributing region and second cam members positioned adjacent to the exit of the distributing region, each of said first and second cam members having two opposite-facing camming surfaces for engaging the respective first and second cam followers of a gripper head, said camming surfaces being tapered with respect to each other at each end of the cam for moving said first and second gripping members apart to the article releasing position upon engagement with the cam member and for allowing the gripping members to close to the article engaging position upon disengagement from the cam member.

3. Apparatus for distributing articles according to claim 1 wherein said endless conveyor is arranged above said predetermined path and extends between two longitudinally spaced wheel means which rotate about horizontal axes lying in a plane parallel to the predetermined path, said first cam member being transversely positioned to align each gripper head with the single line of articles entering the distributing region and said second cam members being transversely positioned in alignment with corresponding gripper heads leaving each of said plurality of adjacent lines of articles leaving the distributing region.

4. Apparatus for distributing articles according to claim 3 wherein said first and second cans have arcuate portions which are curved to follow the curvature of the corresponding one of said wheel means.

5. Apparatus for distributing articles according to claim 1 wherein said at least one track means comprises an entry channel and two exit channels, and said deflection member is pivotable between a first position in which it blocks one of said exit channels and a second position in which it blocks the other of said exit channels.

6. Apparatus for distributing articles according to claim 1 wherein said at least one track means comprises at least two of said branched track means in tandem, the entry channel of the second of said branched track means being aligned with one of the exit channels of the first branched track means.

7. Apparatus for distributing articles according to claim 5 wherein said deflection member comprises a wedge-shaped gate, and wherein each successive guiding means which is engaged by the entry channel of said track means shifts said gate from one to the other of said first and second positions as it enters the corresponding one of said exit channels.

8. Apparatus for distributing articles according to claim 5 further comprising magnetic means for releasably retaining said deflection member in said first and second positions.

9. Apparatus for distributing articles according to claim 5 further comprising means for vertically moving said conveyor relative to the level of said predetermined path.

10. Apparatus according to claim 1 wherein said endless conveyor comprises a first pair of laterally spaced wheels rotatable about an axis extending transversely above the predetermined path adjacent to the entrance of the distributing region, a second pair of laterally spaced wheels rotatable about an axis extending transversely above the predetermined path adjacent to the exit of the distributing region, and a pair of laterally spaced endless chains carried by corresponding ones of each pair of said wheels; the portion of said chains underneath said wheels constituting an advancing portion of said endless conveyor and the portion of said chains above said wheels constituting a returning portion of said endless conveyor; said plurality of mounting means comprise a plurality of longitudinally spaced bars connected to and extending transversely between said chains; and each of gripper heads being slidably mounted on a corresponding one of said transverse bars.

11. Apparatus for distributing articles according to claim 10 wherein said means for aligning each gripper head with the single line of articles prior to entry of the article engaging means into the distributing region comprises a pair of cam surfaces arranged in a generally V-shape in the way of said gripper heads on the returning portion of said endless conveyor.

12. Apparatus for distributing articles according to claim 10 wherein each of said gripper heads comprises a first grip member including a sleeve slidably mounted on the corresponding transverse bar, said guiding means being mounted on said first grip member; a second grip member slidably mounted on the sleeve of the first grip member; and a spring connected between the first and second grip members for resiliently urging said first and second grip members towards each other into said article engaging position.

* * * * *

UNITED STATES PATENT AND TRADEMARK OFFICE
CERTIFICATE OF CORRECTION

PATENT NO. : 4,287,980
DATED : 8 September 1981
INVENTOR(S) : Daniel MONTFERME

It is certified that error appears in the above—identified patent and that said Letters Patent is hereby corrected as shown below:

Column 5, line 19: after "which" insert a comma --,--.

Column 5, line 68: after "seize the" change "bottle" to --bottles--.

Column 6, line 45: after "illustrated" insert a comma --,--.

Column 7, line 51: change "claim 1" to --claim 2--.

Column 7, line 63: after "second" change "cans" to --cams--.

Column 8, line 9: change "claim 1" to --claim 5--.

Column 8, line 26: change "claim 5" to --claim 1--.

Signed and Sealed this

Second Day of February 1982

[SEAL]

Attest:

GERALD J. MOSSINGHOFF

Attesting Officer    Commissioner of Patents and Trademarks